(12) United States Patent
Takeda et al.

(10) Patent No.: US 11,265,905 B2
(45) Date of Patent: Mar. 1, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN); Huiling Jiang, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 16/482,987

(22) PCT Filed: Feb. 2, 2018

(86) PCT No.: PCT/JP2018/003540
§ 371 (c)(1),
(2) Date: Aug. 1, 2019

(87) PCT Pub. No.: WO2018/143389
PCT Pub. Date: Aug. 9, 2018

(65) Prior Publication Data
US 2020/0008232 A1   Jan. 2, 2020

(30) Foreign Application Priority Data
Feb. 2, 2017 (JP) .............................. JP2017-017972

(51) Int. Cl.
*H04W 72/12* (2009.01)
*H04W 72/04* (2009.01)
*H04W 80/08* (2009.01)

(52) U.S. Cl.
CPC ..... *H04W 72/1289* (2013.01); *H04W 72/042* (2013.01); *H04W 72/0446* (2013.01); *H04W 80/08* (2013.01)

(58) Field of Classification Search
CPC .......... H04W 72/1289; H04W 72/042; H04W 72/0446; H04W 80/08
See application file for complete search history.

(56) References Cited

U.S. PATENT DOCUMENTS

2014/0301299 A1* 10/2014 Wu ....................... H04L 5/0053
                                                                   370/329
2015/0282134 A1    10/2015 Suzuki et al.
(Continued)

FOREIGN PATENT DOCUMENTS

| WO | 2014069601 A1 | 5/2014 |
| WO | 2016040290 A1 | 3/2016 |

OTHER PUBLICATIONS

Huawei, HiSilicon, "DCA monitoring occasions and blind detections," 3GPP TSG RAN WG1 NR Ad Hoc Meeting; R1-1700078; Spokane, WA, USA; Jan. 16-20, 2017 (4 pages).
(Continued)

*Primary Examiner* — Kevin M Cunningham
(74) *Attorney, Agent, or Firm* — Osha Bergman Watanabe & Burton LLP

(57) ABSTRACT

The present invention is designed to transmit and/or receive data adequately even when data scheduling methods that are different from those of existing LTE systems are applied. a receiving section that receives downlink control information, and a control section that controls receipt and/or transmission of data scheduled by the downlink control information, where data that is transmitted in the same slot as and/or a different slot from that of the downlink control information is scheduled by the downlink control information, and the control section identifies the position in the time direction where the data is allocated, based on the downlink control information and/or common control information that is common to predetermined user terminals.

6 Claims, 15 Drawing Sheets

(56) References Cited

U.S. PATENT DOCUMENTS

| | | | | |
|---|---|---|---|---|
| 2015/0282234 A1* | 10/2015 | Sartori | .............. | H04W 28/0278 |
| | | | | 370/329 |
| 2016/0014781 A1* | 1/2016 | Nagata | .............. | H04W 72/0453 |
| | | | | 370/329 |
| 2018/0092070 A1* | 3/2018 | Liao | .................... | H04W 72/042 |
| 2018/0132229 A1* | 5/2018 | Li | ..................... | H04W 72/0413 |

OTHER PUBLICATIONS

Ericsson, "Summary of e-mail discussions on downlink control signaling," TSG RAN WG1 NR Ad Hoc; R1-1701036; Spokane, WA, USA; Jan. 16-20, 2017 (18 pages).

Catt, "Indication of NR-PDSCH starting symbol," TSG RAN WG1 AH_NR Meeting; R1-1700194; Spokane, WA, USA; Jan. 16-20, 2017 (2 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

International Search Report issued in PCT/JP2018/003540, dated Apr. 3, 2018 (2 pages).

Written Opinion issued in PCT/JP2018/003540, dated Apr. 3, 2018 (3 pages).

Office Action issued in counterpart Chilean Patent Application No. 201902154, dated Sep. 21, 2020 (18 pages).

Office Action issued in Japanese Application No. 2018-566107; dated Jun. 2, 2020 (12 pages).

3GPP TSG RAN WG1 NR Ad-Hoc Meeting; R1-1700026 "Scheduling scheme for slot aggregation" Huawei, HiSilicon Spokane, USA; Jan. 16-20, 2017 (6 pages).

3GPP TSG RAN WG1 Meeting #87; R1-1612001 "Remaining details of signaling support for reserved resources" Intel Corporation; Reno, USA; Nov. 14-18, 2016 (4 pages).

3GPP TR 38.802 v1.1.0 "3rd Generation Partnership Project; Technical Specification Group Radio Access Nework Study on New Radio (NR) Access Technology Physical Layer Aspects (Release 14)" Jan. 2017 (71 pages).

3GPP TSG RAN WG1 AH_NR Meeting; R1-1700618 "Summary of [87-32]: UL L1/L2 control channel design for NR" NTT Docomo, Inc.; Spokane, USA; Jan. 16-20, 2017 (30 pages).

TSG-RAN WG1 NR AdHoc; R1-1701036 "Summary of e-mail discussions on downlink control signaling" Ericsson Spokane, USA; Jan. 16-20, 2017 (18 pages).

3GPP TSG RAN WG1 Ad-Hoc Meeting; R1-1700942 "UE-Group Common Control Signaling" Samsung; Spokane, USA; Jan. 16-20, 2017 (3 pages).

3GPP TSG-RAN WG1#NR; R1-1701012 "Dynamic reuse of DL control resources for data in NR" Nokia, Alcatel-Lucent Shanghai Bell; Spokane, WA, USA; Jan. 16-20, 2017 (4 pages).

Extended European Search Report issued in European Application No. 18747523.1, dated Nov. 9, 2020 (12 pages).

Office Action issued in Japanese Application No. 2018-566107, dated Oct. 13, 2020 (9 pages).

Catt; "Design principles of DCI formats"; 3GPP TSG RAN WG1 Meeting #87, R1-1611392; Reno, USA; Nov. 14-18, 2016 (4 pages).

Guangdong OPPO Mobile Telecom; "Views on DL control channel for NR"; 3GPP TSG RAn WG1 NR Ad-Hoc Meeting, R1-1700562; Spokane, USA; Jan. 16-20, 2017 (5 pages).

Office Action issued in the counterpart Japanese Patent Application No. 2018-566107, dated Feb. 2, 2021 (8 pages).

Office Action issued in Chilean Application No. 201902154; dated Mar. 12, 2021 (18 pages).

Office Action issued in European Application No. 18747523.1, dated Aug. 4, 2021 (8 pages).

CMCC; "Discussion on DCI in NR"; 3GPP TSG RAN WG1 NR Ad-Hoc Meeting, R1-1700440; Spokane, USA; Jan. 16-20, 2017 (5 pages).

Office Action issued in the counterpart Australian Patent Application No. 2018215303, dated Sep. 13, 2021 (8 pages).

* cited by examiner

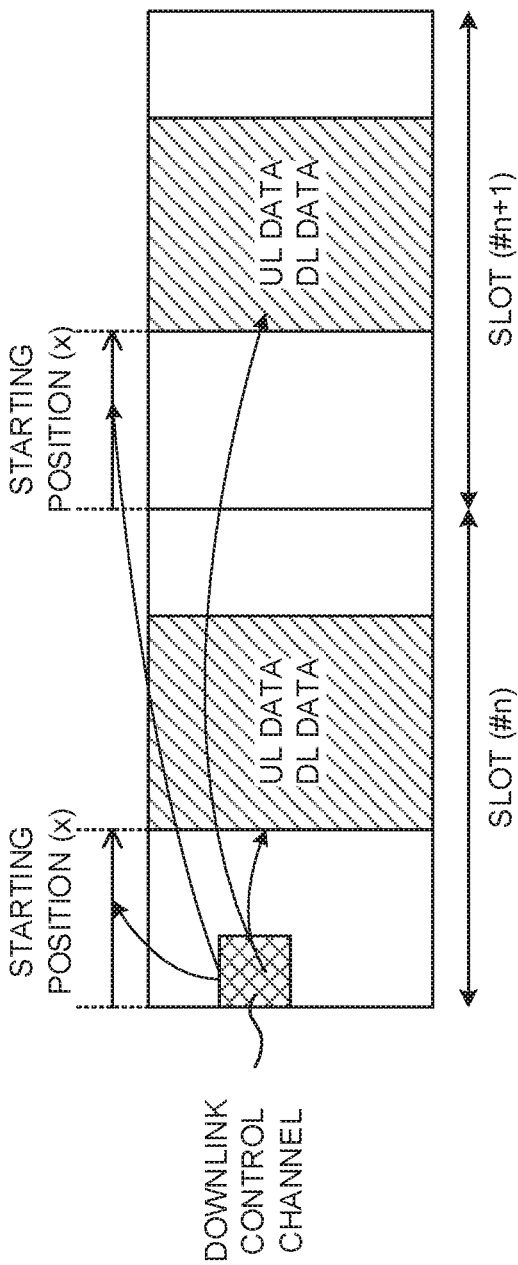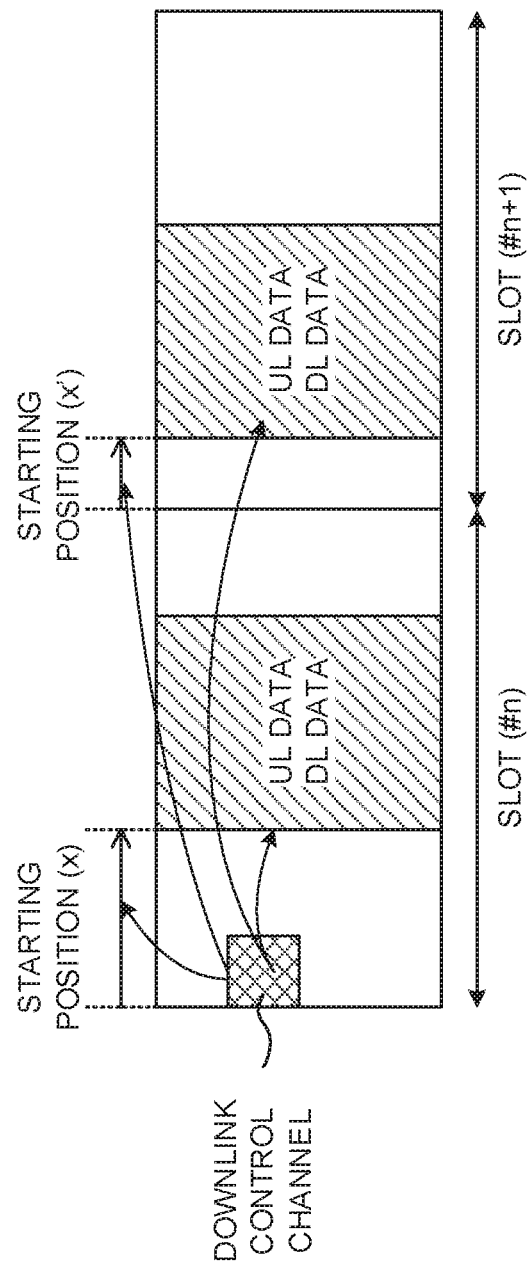

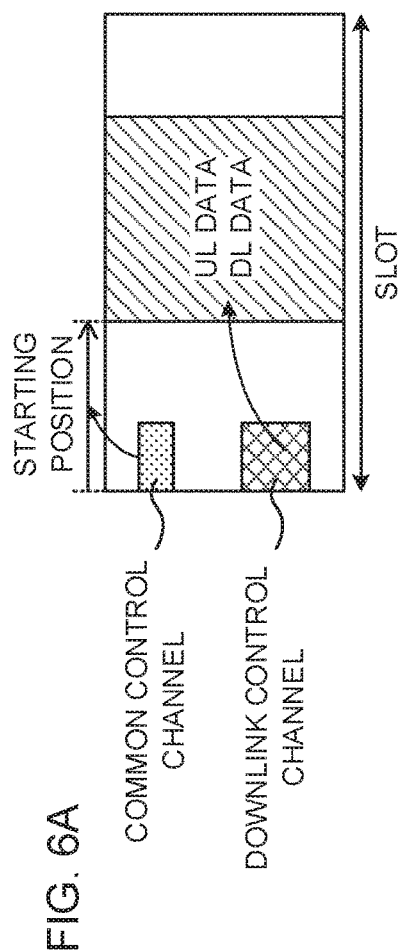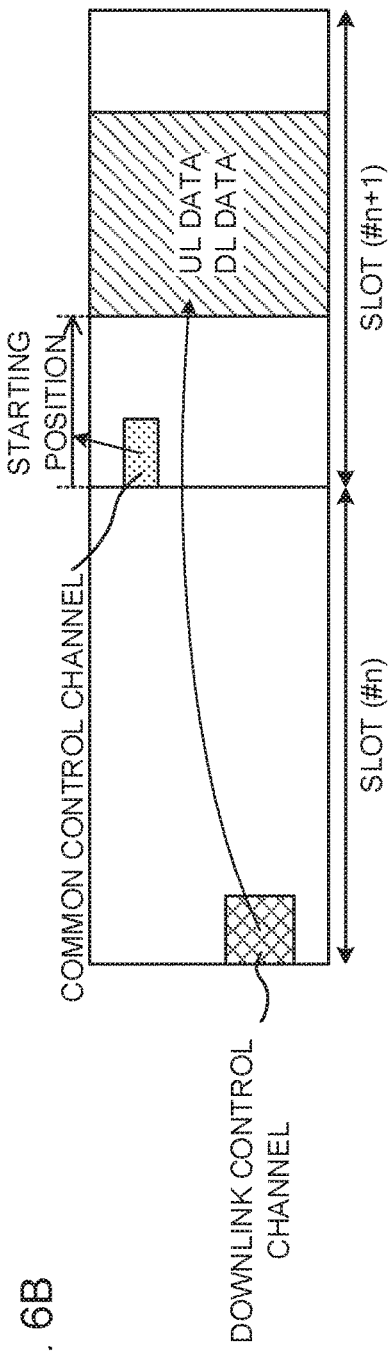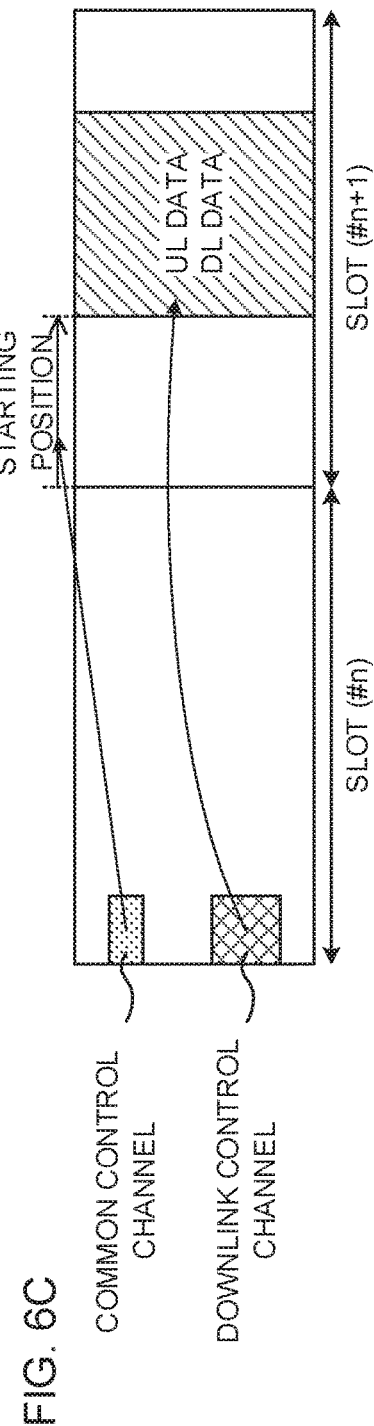

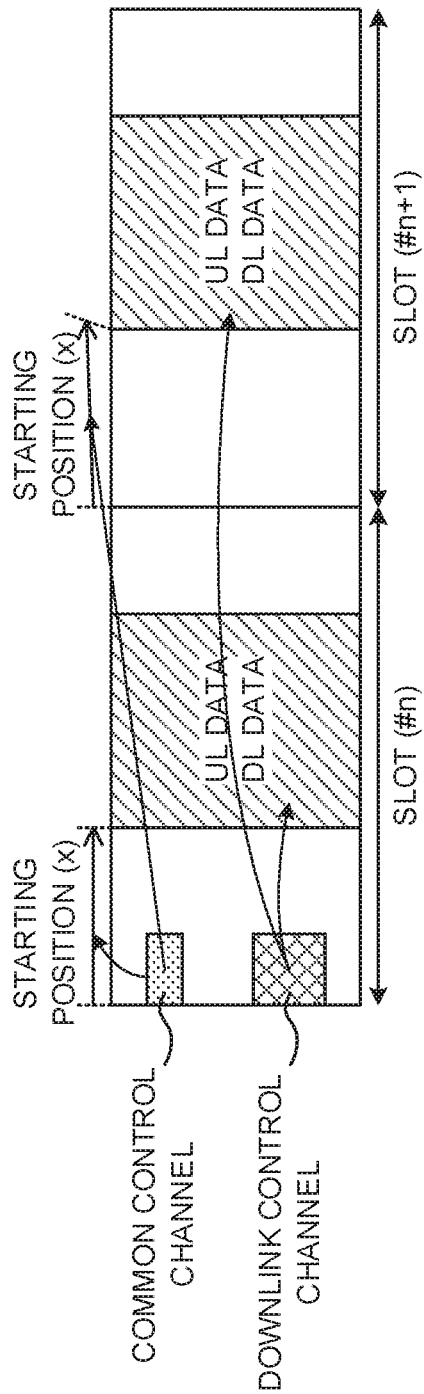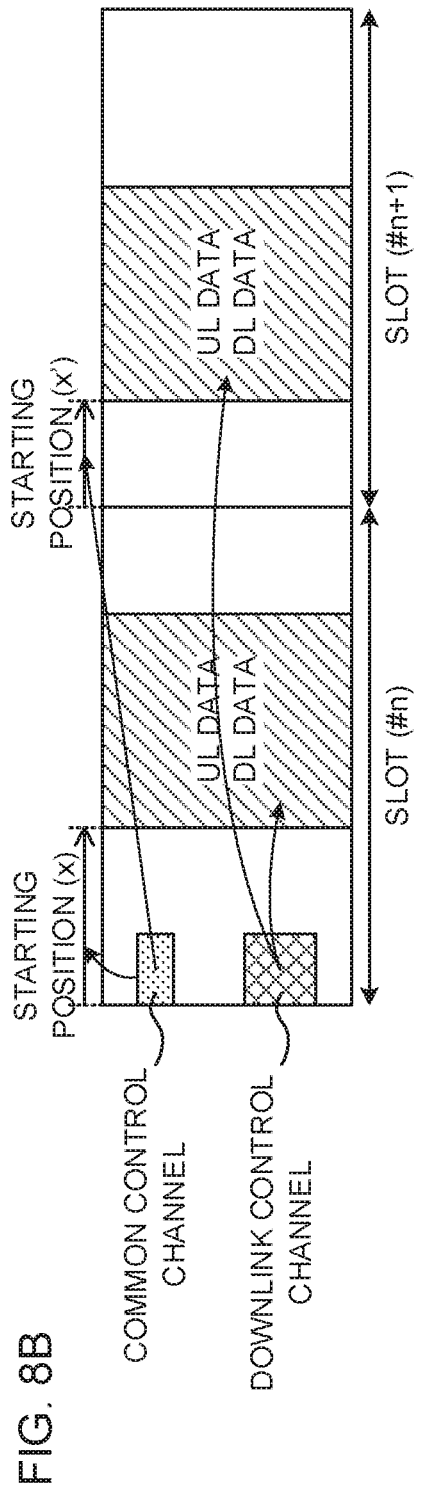

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls the allocation (scheduling) of data for a user terminal, and reports the schedule of data to the user terminal using downlink control information (DCI). The user terminal controls receipt of DL data and/or transmission of uplink data based on the downlink control information. To be more specific, based on the downlink control information, the user terminal receives downlink data in the same subframe as that of the downlink control information, or transmits uplink data in a predetermined subframe in a predetermined period (for example, 4 ms later).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rel. 14, 15 or later versions, 5G, NR, etc.) may control data scheduling based on different configurations than existing LTE systems (for example, LTE Rel. 13 or earlier versions).

For example, in existing LTE systems, DL data in each subframe is scheduled based on downlink control information that is transmitted per predetermined transmission time interval (subframe). Also, based on downlink control information transmitted in a given subframe, UL data is scheduled a predetermined period later. By contrast with this, future radio communication systems are under research to use downlink control information that is transmitted in a given transmission time interval (for example, a slot) to control scheduling of data (UL data and/or DL data) in this same slot and/or in different slots. Note that controlling data scheduling in different slots based on downlink control information in a predetermined slot is also referred to as "cross-slot scheduling."

When cross-slot scheduling is employed, how to control the position to allocate data (for example, the position to start allocating data) in each slot is the problem. Considering the efficiency of the use of resources, it is desirable to configure data allocation in each slot so that it can be changed dynamically. Meanwhile, when data allocation in each slot is controlled dynamically, the problem is how to allow the user terminal to identify the position where data is allocated.

The present invention has been made in view of the above, and it is therefore an object of the present invention to provide a user terminal and radio communication method, whereby data can be transmitted and/or received adequately even when data scheduling methods that are different from those of existing LTE systems are applied.

Solution to Problem

According to one aspect of the present invention, a user terminal has a receiving section that receives downlink control information, and a control section that controls receipt and/or transmission of data scheduled by the downlink control information, where data that is transmitted in the same slot as and/or a different slot from that of the downlink control information is scheduled by the downlink control information, and the control section identifies the position in the time direction where the data is allocated, based on the downlink control information and/or common control information that is common to predetermined user terminals.

Advantageous Effects of Invention

According to the present invention, data can be transmitted and/or received adequately even when data scheduling methods that are different from those of existing LTE systems are applied.

BRIEF DESCRIPTION OF DRAWINGS

FIGS. 4A and 4B are diagrams to show other examples of methods of reporting data starting positions according to the first aspect;

FIGS. 6A to 6C are diagrams to show examples of methods of reporting data starting positions according to a second aspect of the present invention;

FIGS. 8A and 8B are diagrams to show other examples of methods of reporting data starting positions according to the second aspect;

DESCRIPTION OF EMBODIMENTS

Figure 1B:
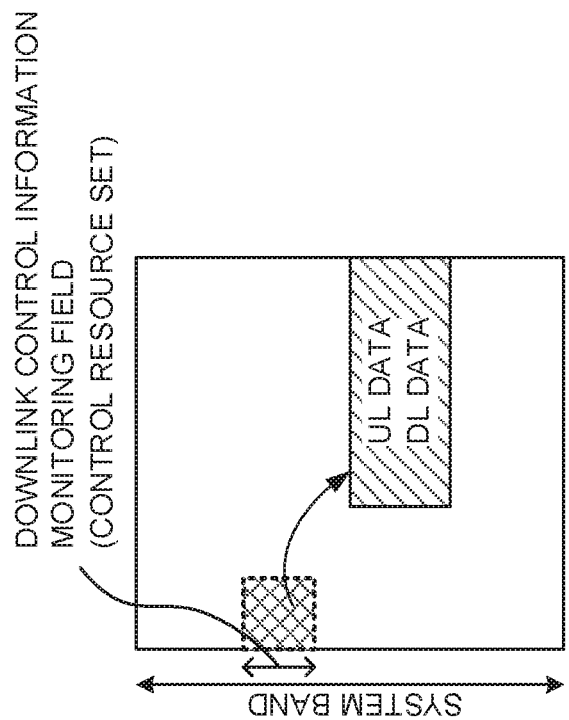
FIGS. 1A and 1B are diagrams to explain frequency bands for monitoring downlink control channels.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of a downlink control channel.

DCI may be scheduling information, including at least one of, for example, data-scheduling time/frequency resources, transport block information, data modulation scheme information, HARQ retransmission information, demodulation RS information, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant." DL assignments and/or UL grants may include information related to the resources, sequences and transmission formats of channels for transmitting UL control signals (UCI: Uplink Control Information) such as HARQ-ACK feedback in response to DL data, channel measurement information (CSI: Channel State Information) and so on. In addition, DCI for scheduling UL control signals (UCI: Uplink Control Information) may be defined apart from DL assignment and UL grants.

A UE is configured to monitor a set of a predetermined number of downlink control channel candidates. To "monitor" in this case means, for example, attempting to decode each downlink control channel for a target DCI format, in the set. Such decoding is also referred to as "blind decoding (BD)" or "blind detection." The downlink control channel candidates are also referred to as "downlink control channel allocation candidates," "BD candidates," "(E)PDCCH candidates," "DCI candidates" and so on.

The set of downlink control channel candidates (multiple downlink control channel candidates) to be monitored is also referred to as "search space." A base station places DCI in a predetermined downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling.

In existing LTE systems, a plurality of aggregation levels (ALs) are provided in a search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, search spaces include a common search space (C-SS), which is configured for UEs on a shared basis, and a UE-specific search space (UE-SS), which is configured per UE.

Future radio communication systems (for example, LTE Rel. 14, 15 and/or later versions, 5G, NR, etc.) are under study to introduce multiple numerologies, not a single numerology.

A numerology may refer to a set of communication parameters that characterize the design of signals in a given RAT (Radio Access Technology), the design of a RAT and so on, and may be parameters that relate to the frequency direction and/or the time direction, such as subcarrier spacing (SCS), symbol duration, cyclic prefix duration, subframe duration and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "minislots," "subslots," "transmission time intervals (TTIs)," "short TTIs," "radio frames" and so on) that are the same and/or different than existing LTE systems (LTE Rel. 13 or earlier versions), while supporting multiple numerologies and so on.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, fourteen symbols), the transport blocks, the code blocks and/or the codewords of transmitting/receiving data can be transmitted and received in one or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of minislots (subslots).

Generally, subcarrier spacing and symbol duration hold a reciprocal relationship. Therefore, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

Furthermore, in future radio communication systems, communication may not be performed using the whole system band in a predetermined carrier at all times, and it is more likely that communication will be controlled by configuring predetermined frequency fields (also referred to as "frequency bands"), dynamically or semi-statically, depending on the purpose of communication, the communicating environment and so on.

Figure 1A:
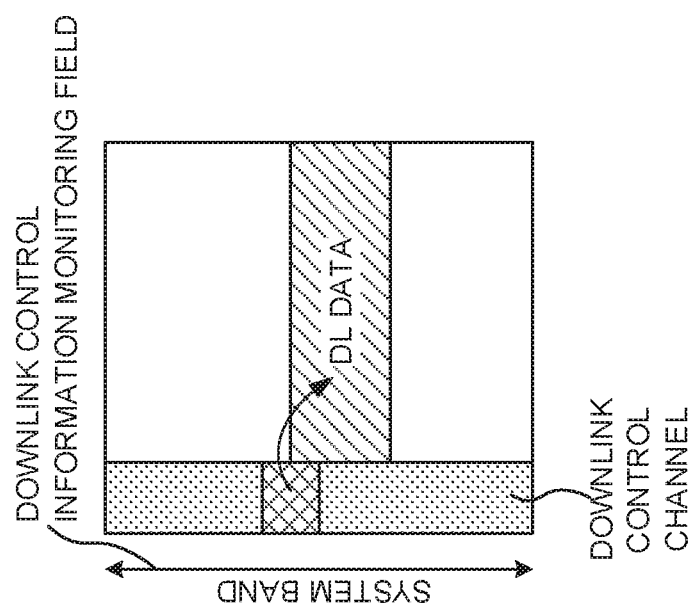

Now, in conventional LTE systems, a downlink control channel (or downlink control information) is transmitted using the whole system bandwidth (see FIG. 1A). Therefore, regardless of whether or not DL data is allocated in each subframe, a UE needs to monitor the whole system bandwidth to receive (blind-decode) downlink control information.

For example, in future radio communication systems, downlink control information for a given UE needs not be necessarily allocated to the whole system band and transmitted, and, instead, it may be possible to configure a predetermined frequency field to control transmission of downlink control information (see FIG. 1B). The predetermined frequency filed that is configured in the UE may be referred to as a "control resource set (CORSET)," a "control subband," a "search space set," a "search space resource set," a "control field," a "control subband," an "NR-PDCCH field," and so on.

A control resource set is comprised of predetermined resource units, and can be configured to be equal to or less than the system bandwidth (carrier bandwidth). For example, a control resource set may be constituted by one or more RBs (PRBs and/or VRBs) in the frequency direction. Here, an RB refers to, for example, a frequency resource block unit comprised of twelve subcarriers. The UE can monitor for downlink control information within the range of the control resource set, and control receipt. By this means, in the receiving process of downlink control information, the UE does not have to keep monitoring the whole system bandwidth at all times, so that its power consumption can be reduced.

Thus, when downlink control information is transmitted using control resource sets, it may be possible to adjust the position to allocate data (for example, the position to start allocating data) in each slot (within a slot and/or between slots), considering the efficiency of the use of resources. In this case, as with existing LTE systems, it may be possible to report data allocation in the PCFICH. However, given that the existing PCFICH designate an allocation starting position that is common to all bands and/or all UEs, it is not possible to control data allocation in a flexible way, and it is difficult to make the efficiency of the use of resources sufficiently high. Also, since the existing PCFICH reports the number of symbols allocated to downlink control channels, when a downlink control channel and data that is allocated are not continuous, it is difficult to report, accurately, the position where the data's allocation is started.

Figure 2:
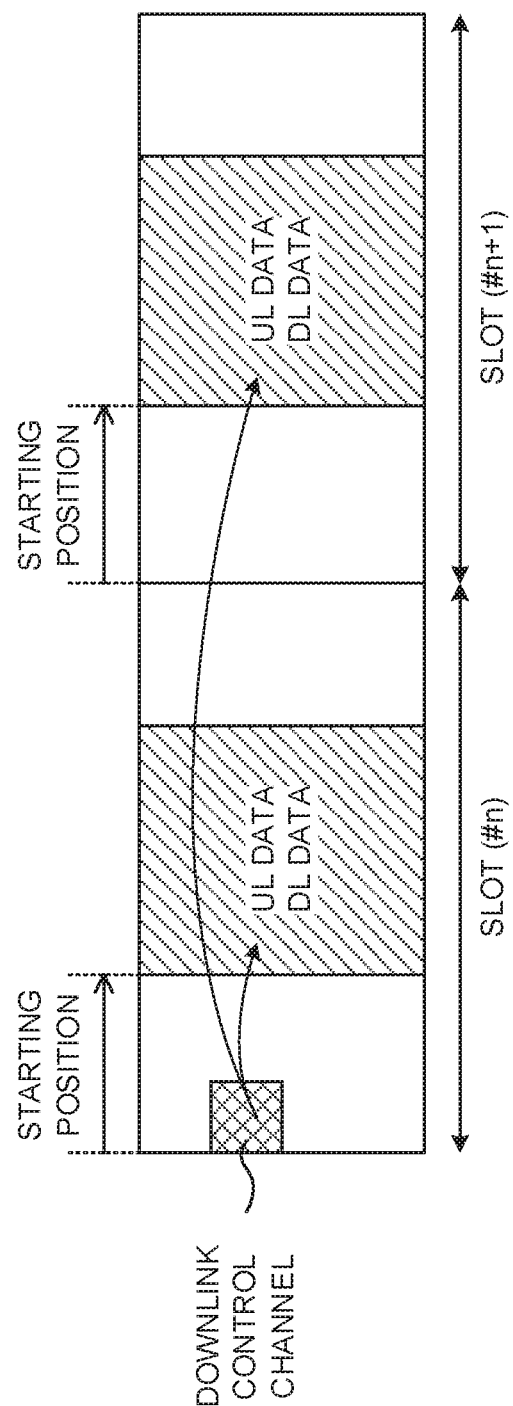
FIG. 2 is a diagram to show an example of cross-slot scheduling.

Also, for future radio communication systems, a study is in progress to use downlink control information, which is transmitted in a given transmission time interval (for example, a slot), to control UL data and/or DL data scheduling in the same slot and/or in different slots (see FIG. 2).

FIG. 2 shows a case where downlink control information (downlink control channel) transmitted in a predetermined slot (#n, in this case) controls scheduling in the predetermined slot (#n) and in another slot (#n+1). The UE controls data transmission and/or receipt in a predetermined slot (#n) and another slot (#n+1) based on downlink control information received in the predetermined slot (#n). Scheduling data in a different slot (here, slot #n+1) by using downlink control information of a predetermined slot (here, slot #n) is also referred to as "cross-slot scheduling."

For example, this scheduling can be implemented by including, in the downlink control information, information about the allocation of frequency resources to data in the scheduling target slot. The information about the allocation of frequency resources may be independent per slot, or may be common among slots. If the slot in which the downlink control information is transmitted is n and the slot in which data is scheduled based on this downlink control information is n+k, the value of k may be configured semi-statically by RRC signaling, or, where there are candidates that are configured semi-statically by RRC signaling, one may be designated, dynamically, by a specific bit field that is included in data-scheduling downlink control information.

When cross-slot scheduling is employed, cases occur where, in slots in which data is scheduled, downlink control information that schedules this data is not necessarily transmitted. The problem in such cases is how to allow the UE to identify the position where the data is allocated.

The present inventors have noted that cases occur where data and downlink control information that schedules this data are not necessarily transmitted in the same slot, and come up with the idea of reporting, to the user terminal, the position where the data is allocated by using the data-scheduling downlink control information and/or common control information, which is common to predetermined user terminals (or a user group).

Now, an embodiment of the present invention will be described in detail below with reference to the accompanying drawings. Although cases will be illustrated with the following embodiment where data scheduling is controlled on a per slot basis, other time units can be used likewise (for example, subframes, minislots, subslots, transmission time intervals (TTIs), short TTIs, radio frames, etc.). Furthermore, in the following description, cases where scheduling in a predetermined slot (#n) and the next slot (#n+1) is controlled will be is shown to illustrate cross-slot scheduling, the number of slots to apply to cross-slot scheduling to, the indices of slots and so on are by no means limited to the herein-contained examples.

(First Aspect)

In accordance with a first aspect of the present invention, a case will be described below, in which information about the position where data is allocated is reported to a user terminal by using user terminal-specific downlink control information (UE-specific DCI). This information related to the position where data is allocated may show the position where downlink data starts (for example, the starting symbol) and/or the position where uplink data starts (for example, the starting symbol). In addition to the information showing the position where data allocation starts, information related to the position where data allocation ends (for example, the ending symbol) may be provided as well. Also, information about the data allocation starting position and/or ending position may be common to all frequency resources, or different values may be reported depending on frequency resources (for example, PRB indices, subband indices, and others).

Note that the information related to the position where data is allocated has only to be information that can specify the position where data is allocated, and does not necessarily have to show the position where data starts (starting position). For example, if the starting positions of a downlink control channel (or downlink control information) and data are correlated, information about the position where the downlink control channel ends (for example, the ending symbol) may be reported to the user terminal. In this case, the user terminal can identify the data's starting position based on the reported information about the ending position of the downlink control channel. Similarly, information about the position where an uplink control channel starts (for example, the starting symbol) may be reported to the user terminal. In this case, the user terminal can identify the data's ending position based on the reported information about the starting position of the uplink control channel.

Methods of reporting information related to allocation positions when downlink control information schedules data that is transmitted in the same slot (self-slot scheduling), when downlink control information schedules data that is transmitted in different slots (cross-slot scheduling) and when downlink control information schedules data that is transmitted in the same slot and in different slots (multi-slot aggregation) will be described below. Furthermore, when, simply "data" is mentioned in the following description, both DL data and UL data may be applicable.

<Self-Slot Scheduling>

Figure 3A:
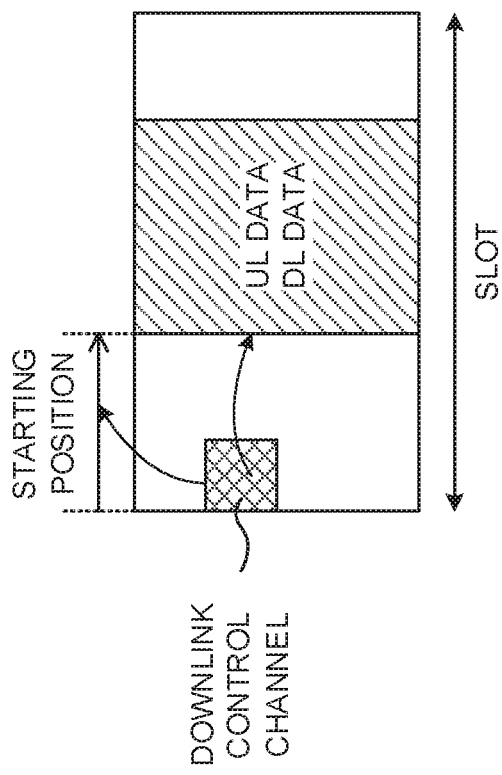
FIGS. 3A and 3B are diagrams to show examples of methods of reporting data starting positions according to a first aspect of the present invention.

FIG. 3A shows a case, in which the position where data that is scheduled in a predetermined slot is allocated (here, the starting position) is reported by using downlink control information that is transmitted in the same predetermined slot. That is, the radio base station reports the frequency field in which data is allocated, and the slot, to the user terminal by using downlink control information, and, furthermore, reports the data's starting position in the slot to the user terminal.

In this way, information about the position where data starts is included in downlink control information that schedules the data, so that, when self-slot scheduling is employed, it is possible to control data starting positions in a flexible way, on a per user terminal basis.

<Cross-Slot Scheduling>

Figure 3B:
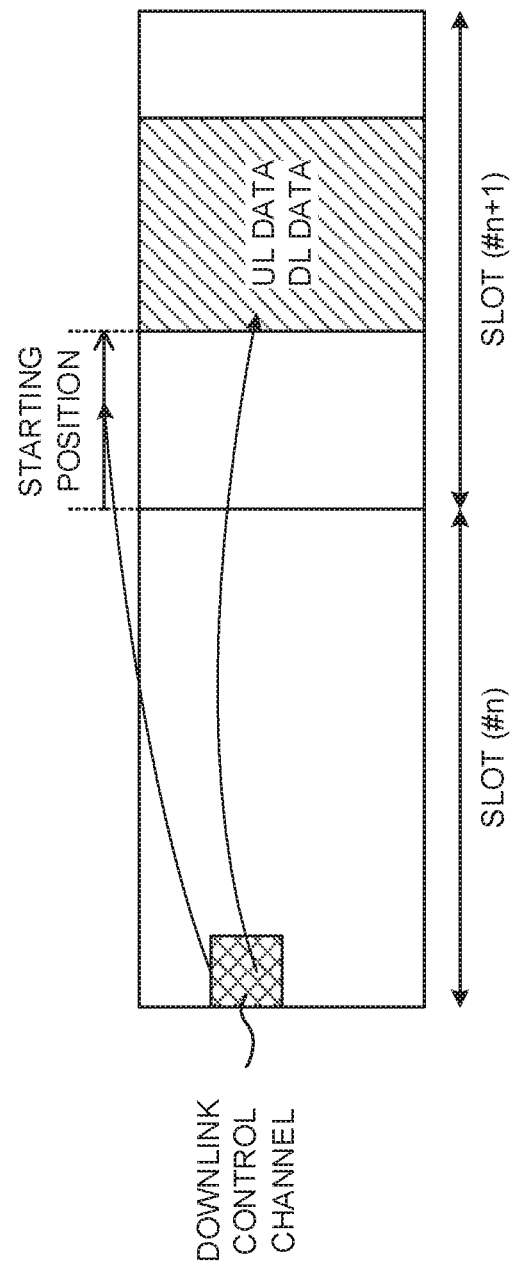

FIG. 3B shows a case, in which the starting position of data scheduled in one slot (here, #n+1) is reported by using downlink control information that is transmitted in another slot (here, #n). That is, the radio base station reports the frequency field in which data is allocated, and the slot (#n+1), to the user terminal by using downlink control information, and, furthermore, reports the data's starting position in the slot (#n+1) to the user terminal.

The user terminal controls receipt or transmission of data from a predetermined starting position in slot #n+1 based on the downlink control channel (downlink control information) received in slot #n. In this case, at the timing (slot #n) the downlink control information is received, the user terminal can identify the starting position of data that is transmitted in another slot #n+1.

<Multi-Slot Aggregation>

FIG. 4 shows a case, in which the starting positions of data, scheduled individually in multiple slots (here, #n and #n+1), are reported by using downlink control information that is transmitted in a predetermined slot (here, #n). That is, the radio base station reports the frequency fields in which data is allocated, and the slots, (#n and #n+1) to the user terminal by using downlink control information, and furthermore, reports the data's starting positions in these slots (#n and #n+1) to the user terminal.

FIG. 4A shows case, in which, in each slot (here, #n and #n+1) where data is scheduled by downlink control information, information about a data starting position (x), which is common to each slot, is included in the downlink control information and indicated to the user terminal. The user terminal applies the information about the data starting position, included in the downlink control information (here, x), to the data in each slot scheduled by the downlink control information (#n and #n+1). In this case, it is possible to reduce the increase in the number of bits of the information related to the data starting position included in the downlink control information.

FIG. 4B shows a case, in which, in each slot (here, #n and #n+1) where data is scheduled by downlink control information, information about data starting positions (x and x'), which are configured independently per slot, is included in the downlink control information and indicated to the user terminal. The user terminal independently applies the information (here, x and x') about the data starting positions, included in the downlink control information, to the data in each slot scheduled by the downlink control information. In this case, data starting positions can be configured independently, on a per slot basis, so that data allocation can be controlled flexibly, depending on the situation of communication. This makes it possible to improve the efficiency of use of resources.

Note that x and x' are each an integer equal to or greater than 0, and the range of possible values may be common to all users, or may vary depending on, for example, the processing time each user requires for the data receiving/decoding process, the buffer memory size and so on. In this case, the range of possible values of x (and/or x') that can be configured for this user is preferably reported to the base station. Note that, although the range of values that x (and/or x') can take varies from user to user, specific values (for example x (and/or x')=0 to 2) may be common to all users.

Note that FIG. 4 show cases in which information about data's starting position in each slot is included in downlink control information that schedules this data, but this is by no means limiting. For example, preconfigured values may be applied to data allocation in some slots. The preconfigured values may be values that are defined in the specification (for example, fixed values) and/or elsewhere, or may be values that are reported semi-statically by higher layer signaling and/or other means.

Figure 5:
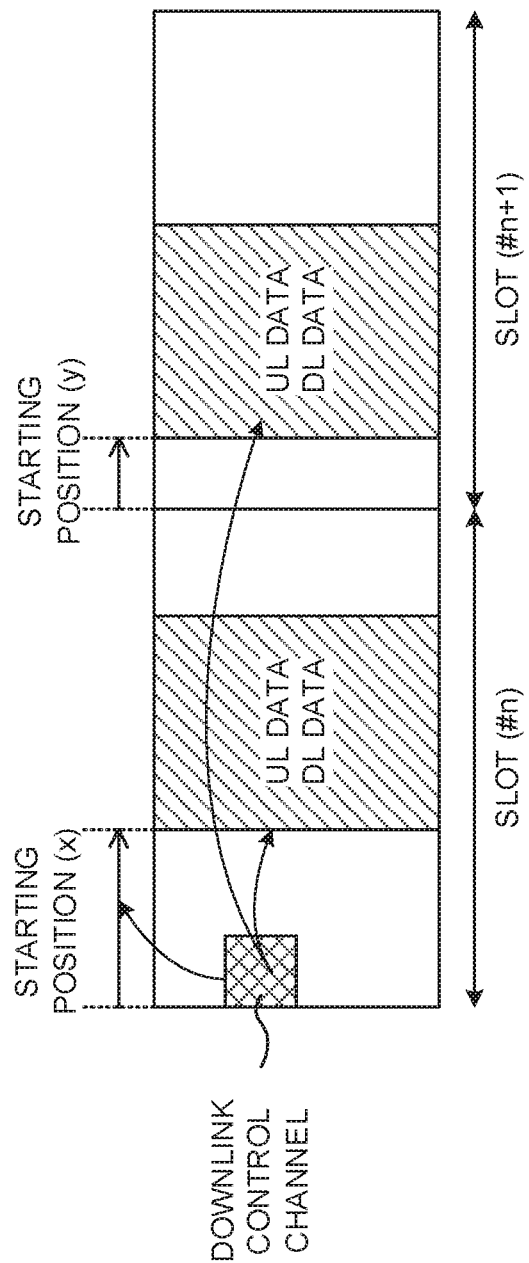
FIG. 5 is a diagram to show another example of the method of reporting data starting positions according to the first aspect.

FIG. 5 shows a case where data for a plurality of slots (here, #n and #n+1) is scheduled using downlink control information that is transmitted in a predetermined slot (here, #n). Also, a case is shown here where information about the data starting position (x) in a predetermined slot (for example, #n) is reported by using downlink control information, and where information about the data starting position (y) in another slot is determined by means other than the downlink control information.

That is, the radio base station reports the frequency fields where data is allocated, and the slots (#n and #n+1), to the user terminal by using downlink control information, and, furthermore, reports the data starting position in part of the slots (here, #n) to the user terminal. The data starting positions in other slots (here, #n+1) may be reported separately via higher layer signaling and so on.

The user terminal applies the information related to the data starting position (here, x) included in the downlink control information to the data of a predetermined slot (#n) scheduled by this downlink control information, and applies information (here, y) that is separately configured, to other slots (#n+1). In this case, a starting position that is reported dynamically via downlink control information is applied to the data that is scheduled first, and predetermined starting positions, which are configured in advance, are applied to data scheduled thereafter.

Note that y is an integer equal to or greater than 0, and the range of possible values may be common to all users, or may vary depending on, for example, the processing time each user requires for the data receiving/decoding process, the buffer memory size and so on. In this case, the range of possible values of y that can be configured for this user is preferably reported to the base station. Note that, although the range of values that x can take varies from user to user, specific values (for example y=0 to 2) may be common to all users.

As a result of this, at least slots that are very close so that their communicating environment can be judged in detail can be controlled dynamically, and, for subsequent (future) slots where the communicating environment may change, predetermined starting positions can be configured in advance. As a result of this, it is possible to reduce the increase in the number of bits of information related to data starting positions, included in downlink control information, and, furthermore, control data allocation dynamically, at least in slots that are very close.

Although FIG. 5 shows a case where only the starting position of data that is scheduled in the same slot as downlink control information (or of the data that is scheduled first) is reported by using this downlink control information, this is by no means limiting. In addition to the starting position of data that is scheduled in the same slot as downlink control information (or the data that is scheduled first), the data starting positions in slots up to a predetermined period later (or a predetermined number of times) may be reported in downlink control information, and the rest of the data starting positions may be configured by means other than the downlink control information.

In addition, although FIG. 4 and FIG. 5 show cases where downlink control information schedules data at least in the slot where the downlink control information is transmitted, this is by no means limiting. The downlink control information may be configured to schedule in a plurality of other slots, without scheduling data in the slot in which the downlink control information is transmitted. In addition, although FIGS. 4 and 5 show cases where data scheduling is executed in consecutive slots, but this is by no means limiting, and it is equally possible to control data scheduling in non-consecutive slots.

(Second Aspect)

In accordance with a second aspect of the present invention, a case will be described below, in which information about the position where data is allocated is reported to a user terminal by using control information that is common between user terminals (common control information). The common control information may be control information that is common to all user terminals that communicate with a certain base station (or a cell), or may be control information that is common to a predetermined user group.

Furthermore, the common control information may be referred to as "group-common L1 signaling," "group-common PDCCH," "common PDCCH," or "common L1 signaling."

Methods of reporting information related to allocation positions when downlink control information schedules data that is transmitted in the same slot (self-slot scheduling), when downlink control information schedules data that is transmitted in different slots (cross-slot scheduling) and when downlink control information schedules data that is transmitted in the same slot and in different slots (multi-slot aggregation) will be described below. Furthermore, when, simply "data" is mentioned in the following description, both DL data and UL data may be applicable.

<Self-Slot Scheduling>

FIG. 6A shows a case where data transmitted in a predetermined slot is scheduled by using downlink control information (UE-specific control information) that is transmitted in the same predetermined slot, and the position where the data is allocated (here, the starting position) is reported by using a common control channel (or common control information) that is transmitted in the same predetermined slot. That is, the radio base station reports the frequency field where data is allocated, and the slot, to a user terminal by using downlink control information, and reports the data's starting position in the slot to the user terminal by using common control information.

In this way, by including information related to the position where data starts, in common control information, it is possible to control data starting positions in a flexible manner, on a per slot basis, and reduce the increase in the number of bits of data-scheduling downlink control information.

<Cross-Slot Scheduling>

FIGS. 6B and 6C show cases where data that is transmitted in a predetermined slot (here, #n+1) is scheduled with downlink control information transmitted in another slot (here, #n), and where the data's starting position is reported in a common control channel (or common control information).

To be more specific, FIG. 6B shows a case where the starting position of data is reported by using common control information provided in the same slot (here, #n+1) as the slot in which the data is scheduled. In this case, the base station can report the position where the data is allocated, to the user terminal, in the slot in which the data is actually allocated, so that it is possible to control data starting positions in a flexible way, depending on the situation of communication.

FIG. 6C shows a case where the starting position of data is reported using common control information provided in the same slot (here, #n) as the slot in which downlink control information that schedules this data is transmitted. In this case, the user terminal can identify, in advance, the downlink control information that controls scheduling of data, and the common control information that designates the starting position of the data. As a result of this, it is possible to reserve the time required for the data transmission process and/or receiving process in the user terminal.

In addition, when executing cross-slot scheduling, predetermined values that are configured in advance may be used as data starting positions. For example, if data that is transmitted in a predetermined slot (#n+1) is scheduled by downlink control information provided in another slot (#n), the starting position of the data assumes a predetermined value that is configured in advance. The predetermined value may be a fixed value defined in the specification, or a value that is configured in the user terminal via higher layer signaling and so on. In this case, the user terminal can identify the starting position of the data without considering the common control information that is reported per slot. Alternatively, the starting position of the data may be configured using common control information that is reported every predetermined period.

<Multi-Slot Aggregation>

Figure 7:
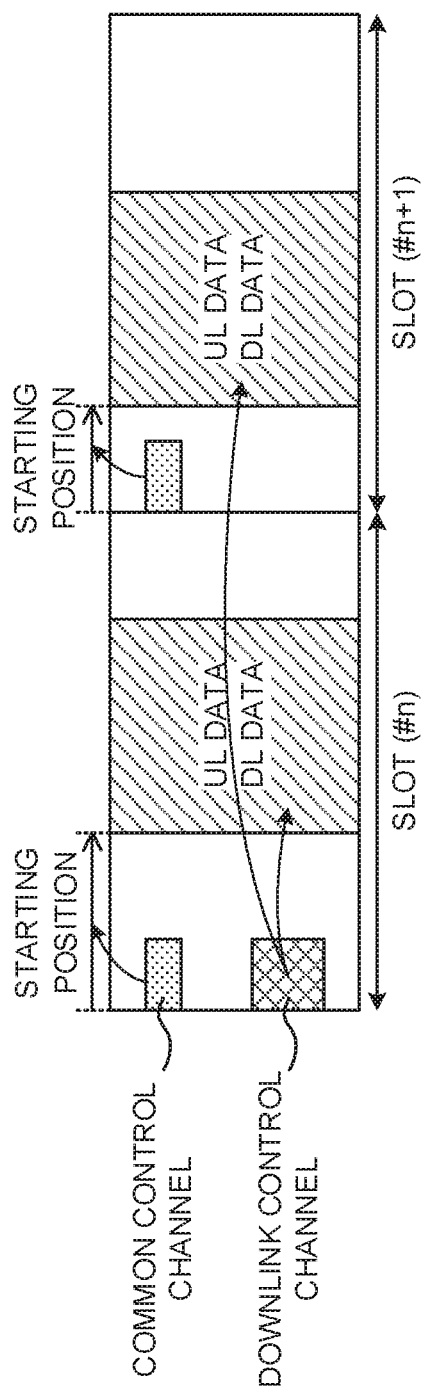
FIG. 7 is a diagram to show another example of the method of reporting data starting positions according to the second aspect.

FIG. 7 and FIG. 8 show cases where data transmitted in a plurality of slots (here, #n and #n+1) is scheduled using downlink control information that is transmitted in a predetermined slot (here, #n), and, furthermore, the data's starting positions are reported in common control information.

To be more specific, FIG. 7 shows a case where the starting position of each data is reported using common control information that is provided in the same slot as the slot in which each data is scheduled. The base station reports the schedule of data in multiple slots (#n and #n+1), to the user terminal, by using downlink control information provided in a slot (#n), and reports the data starting position in each slot by using the common control information of each slot.

In this case, for each slot in which data is allocated, the base station can control the position for allocating the data, and report this position to the user terminal. As a result of this, the position where the data is allocated (for example, the starting position) can be controlled flexibly, depending on the situation of communication. For example, when UL data is scheduled a number of slots after a slot in which downlink control information is transmitted, a structure may be adopted in which the starting position is reported in common control information a number of slots later, so that, it is possible to control the allocation of the UL data flexibly, even when the situation of communication changes after a number of slots.

FIG. 8 shows a case where the starting position of each data is reported using common control information transmitted in the same slot as downlink control information that schedules this data. FIG. 8A shows a case where, in each slot (here, #n and #n+1) in which data is scheduled, information related to a data starting position (x) that is common to each slot is included in the common control information of the slot (#n) where downlink control information is transmitted, and indicated to the user terminal.

The user terminal applies the information related to the data starting position (here, x) contained in the common control information to the data of each slot (#n and #n+1) scheduled by the downlink control information. This can reduce the increase in the number of bits of the information related to the data starting position included in the common control information.

FIG. 8B shows a case where, in each slot (here, #n and #n+1) where data is scheduled, information about data starting positions (x and x') that are independently configured on a per slot basis is included in the common control information of the slot where downlink control information is transmitted (#n), and indicated to the user terminal.

The user terminal independently applies the information related to data starting positions (here, x and x'), included in common control information, to the data in each slot that is scheduled by downlink control information. In this case, data starting positions can be configured per slot, independently, so that data allocation can be controlled flexibly, depending on the situation of communication. This makes it possible to improve the efficiency of the use of resources.

Figure 9:
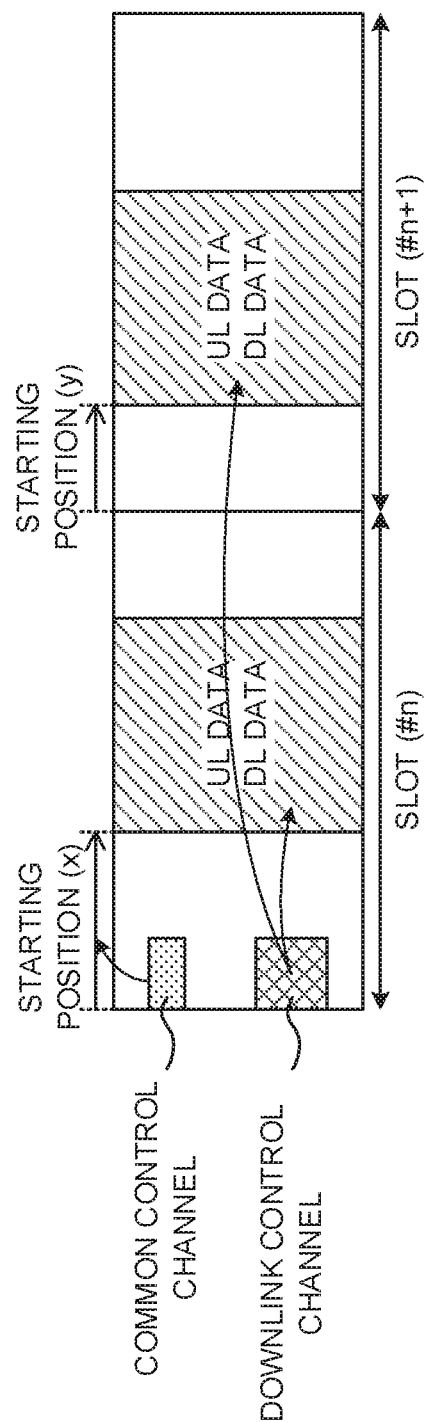
FIG. 9 is a diagram to show another example of the method of reporting data starting positions according to the second aspect.

FIG. 9 shows a case where information related to the data starting position (x) in a predetermined slot (for example, #n) is reported in common control information in a slot in which downlink control information (or the first data scheduled by the downlink control information) is transmitted, and where information related to the data starting position (y) in another slot is determined by means other than the downlink control information. The data starting position in other slots (here, #n+1) may be reported separately, such as via higher layer signaling.

The user terminal applies the information (here, x), which relates to the data starting position and which is included in common control information, to the data in the predetermined slot (#n), and applies separately-configured information (here, y) to other slots (#n+1). In this case, a starting position that is reported dynamically in common control information is applied to the data that is scheduled first, and predetermined starting positions, which are configured in advance, are applied to the data scheduled thereafter.

As a result of this, at least slots that are very close so that their communicating environment can be judged in detail can be controlled dynamically, and, for subsequent (future) slots where the communicating environment may change, predetermined starting positions can be configured in advance. As a result of this, it is possible to reduce the increase in the number of bits of information related to data starting positions, included in common control information, and, furthermore, control data allocation dynamically, at least in slots that are very close.

Although FIG. 9 shows a case where only the starting position of data that is scheduled in the same slot as downlink control information (or of the data that is scheduled first) is reported by using this common control information, this is by no means limiting. In addition to the starting position of data that is scheduled in the same slot as downlink control information (or the data that is scheduled first), the data starting positions in slots up to a predetermined period later (or a predetermined number of times) may be reported in common control information, and the rest of the data starting positions may be configured by means other than the downlink control information.

Also, when multi-slot aggregation is used, predetermined values, which are configured in advance, may be used as data starting positions. For example, if data that is transmitted in a predetermined slot (#n+1) is scheduled by downlink control information provided in another slot (#n), the data's starting position may assume a predetermined value that is configured in advance. The predetermined value may be a fixed value defined in the specification, or a value that is configured in the user terminal via higher layer signaling and so on. In this case, the user terminal can identify the starting position of the data without considering the common control information that is reported per slot. Alternatively, the starting position of the data may be configured using common control information that is reported every predetermined period.

Note that if information related to the starting position of data that is transmitted in a predetermined slot (#n+k, where, for example, k=1) is reported in common control information that is provided in another slot (#n), the information related to the data starting position may be updated based on common control information provided between the other slot (#n) and the predetermined slot (#n+k). The user terminal monitors the common control information during the period from slot #n to slot #n+k, and, upon detecting information that updates the data starting position in slot #n+k, changes the data starting position in slot #n+k. When making this change of starting position, the user terminal updates the rate matching of transmitting data, punctures the data, or inserts additional parity bits. As a result of this, it is possible to dynamically control the amount of resources used, on a slot-by-slot basis, according to the situation of the use of radio resources.

(Third Aspect)

In accordance with a third aspect of the present invention, a case will be described below, in which information related to the position where data is allocated is reported to a user terminal by using a combination of user terminal-specific downlink control information and control information that is common to user terminals (common control information).

When the user terminal detects common control information that indicates data starting position, the user terminal controls data transmission and/or receipt with reference to the data starting position included in this detected common control information. On the other hand, if the user terminal does not receive common control information that indicates data's starting position, the user terminal may control data transmission and/or receipt based on information related to data starting positions, included in downlink control information.

In this case, the user terminal attempts to receive the common control information reported in each slot and identify the data starting position, and, in slots where no common control information is received, the user terminal may identify data starting positions based on downlink control information. As a result of this, even if the user terminal fails to detect common control information, the user terminal can identify the starting position of data based on downlink control information that schedules the data.

Also, in multi-slot aggregation, the user terminal may identify data starting positions in one or more predetermined slots based on downlink control information, and identify data starting positions in the rest of the slots based on common control information.

For example, the base station reports the starting position of the first one piece of data, or the starting positions of the first multiple pieces of data, out of multiple pieces of data that are scheduled using downlink control information, to the user terminal, in common control information, and reports the starting positions of the rest of the data, to the user terminal, via downlink control information.

Alternatively, the base station reports the starting position of the first one piece of data, or the starting positions of the first multiple pieces of data, in the time direction, out of multiple pieces of data that are scheduled using downlink control information, to the user terminal, in the downlink control information, and reports the starting positions of the rest of the data to the user terminal via common control information.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 10:
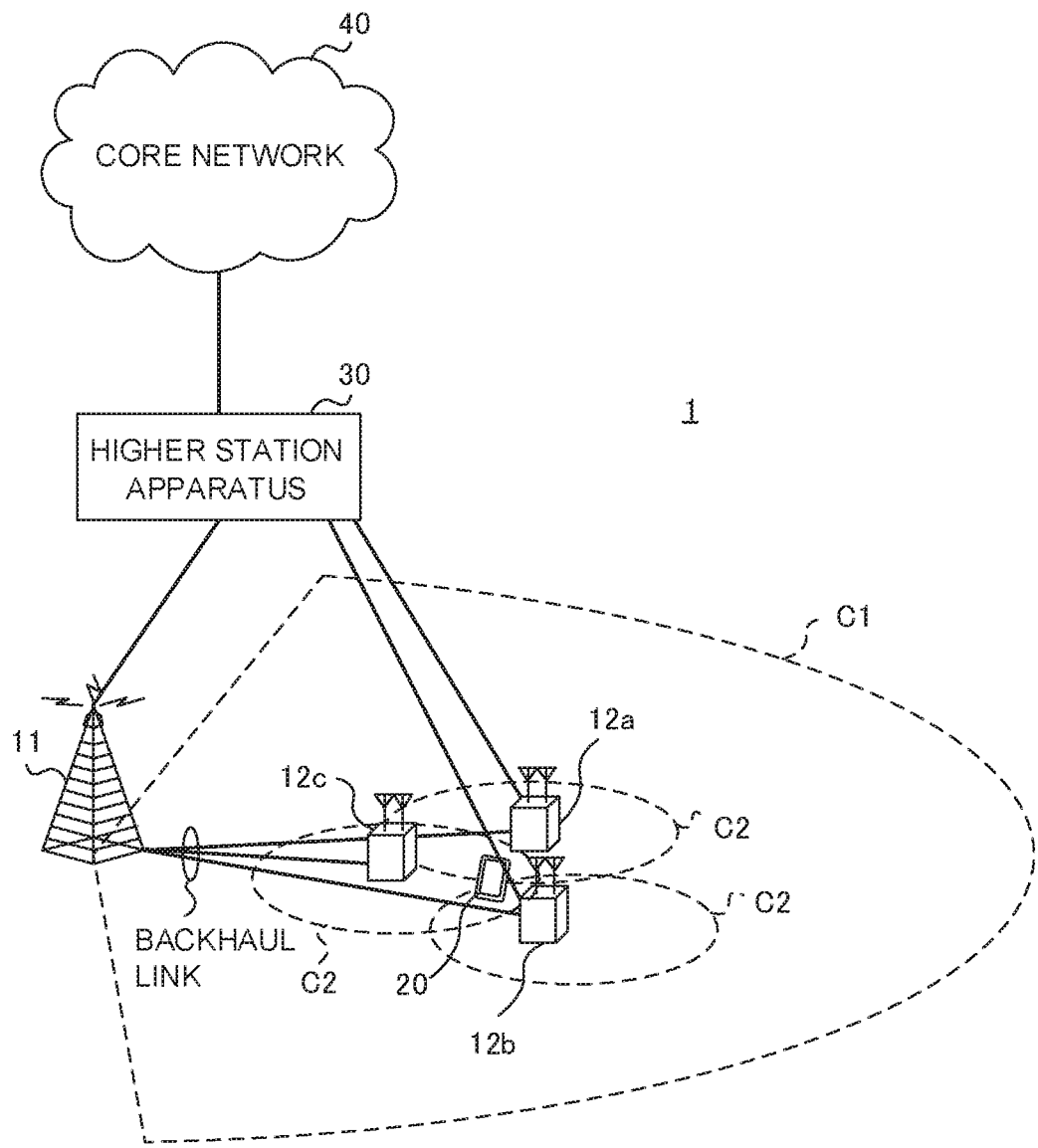
FIG. 10 is a diagram to show an example of a schematic structure of a radio communication system according to an embodiment of the present invention.

FIG. 10 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," "NR (New Radio)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those shown in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "gNB," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 11:
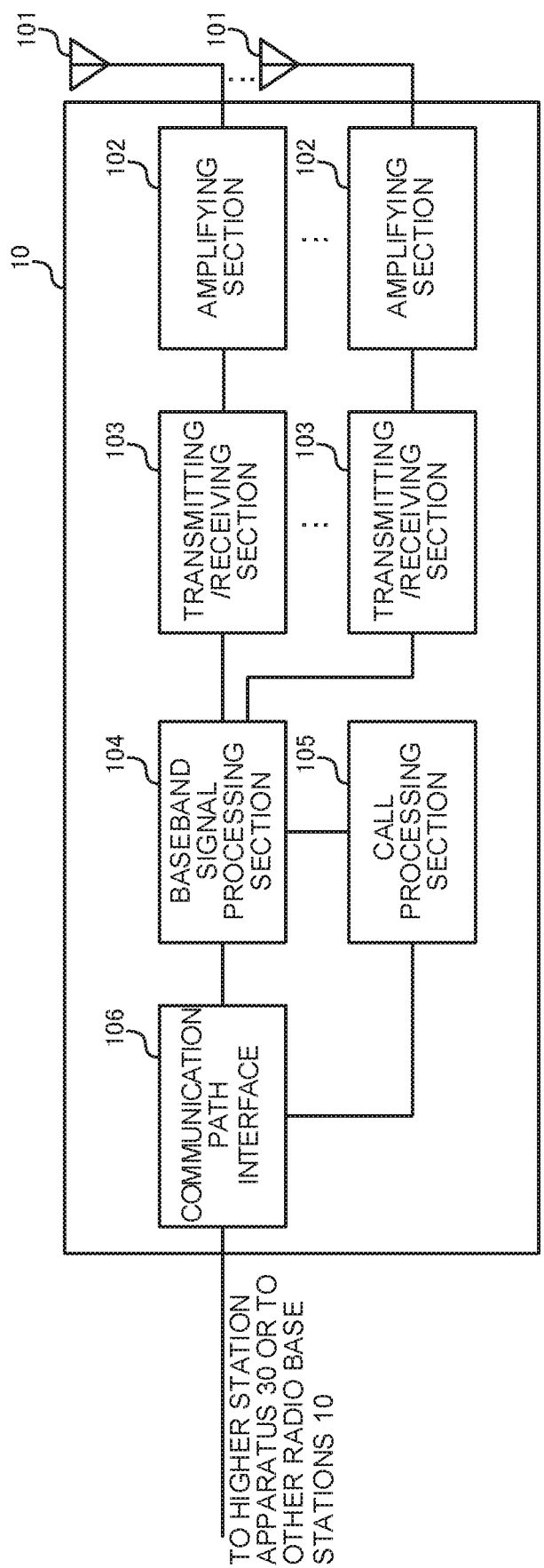
FIG. 11 is a diagram to show an example of an overall structure of a radio base station according to an embodiment of the present invention.

FIG. 11 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a downlink control channel (for example, an NR-PDCCH) using a search space (a C-SS and/or a UE-SS). Furthermore, the transmitting/receiving sections 103 transmit DL data and/or receive UL data by applying cross-slot scheduling. Also, transmitting/receiving sections 103 include and transmit information about the position where data allocation starts in the time direction in each slot, in downlink control information that schedules the data, and/or in common control information that is common to predetermined user terminals.

Figure 12:
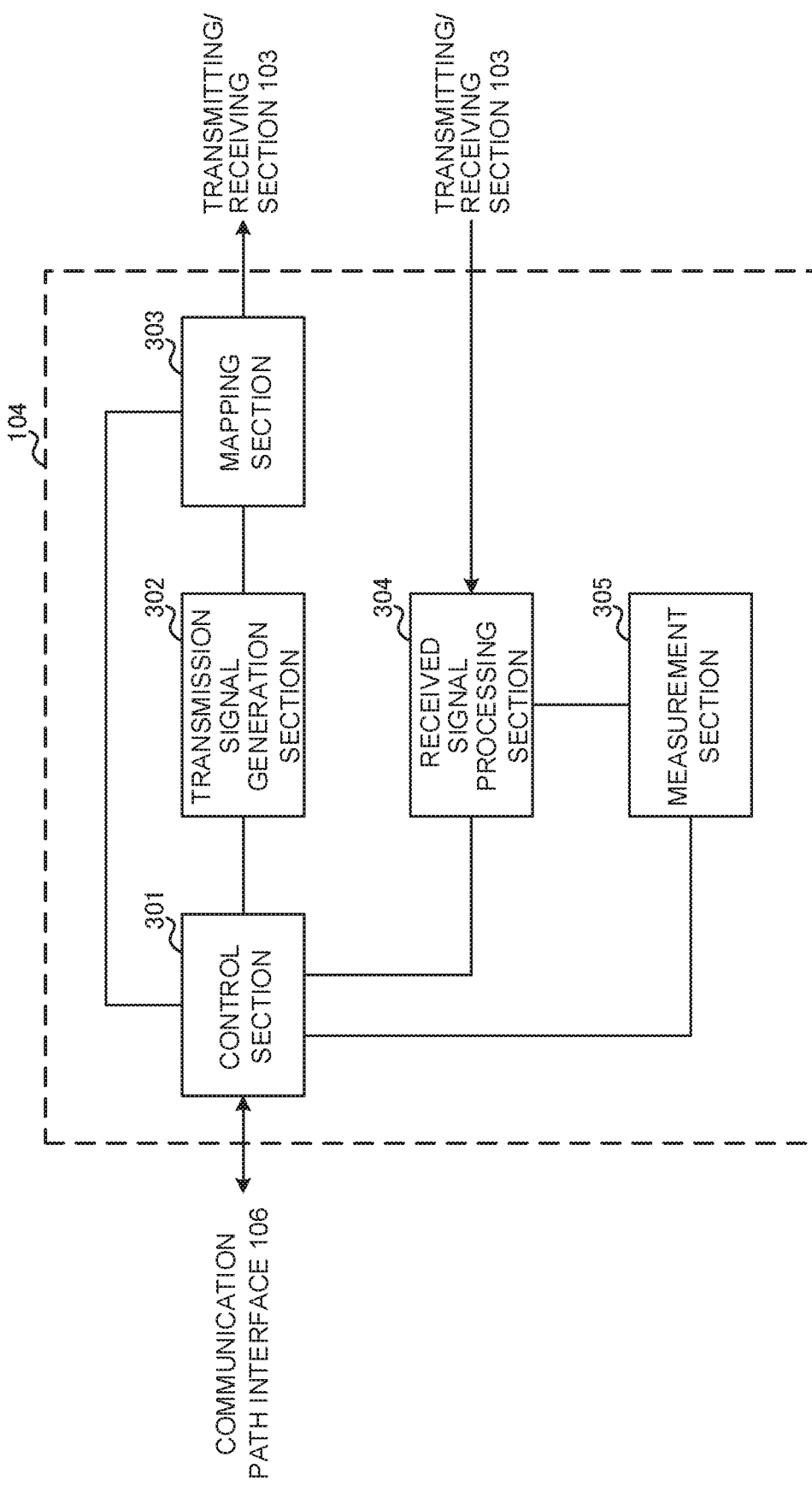
FIG. 12 is a diagram to show an example of a functional structure of a radio base station according to an embodiment of the present invention.

FIG. 12 is a diagram to show an example of functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in downlink control channels). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 controls the scheduling of DL data and/or UL data by applying cross-slot scheduling (see FIG. 3 to FIG. 5). The control section 301 performs control so that information about the position where data allocation starts in the time direction in each slot is included in downlink control information that schedules this data and/or in common control information that is common to predetermined user terminals.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 13:
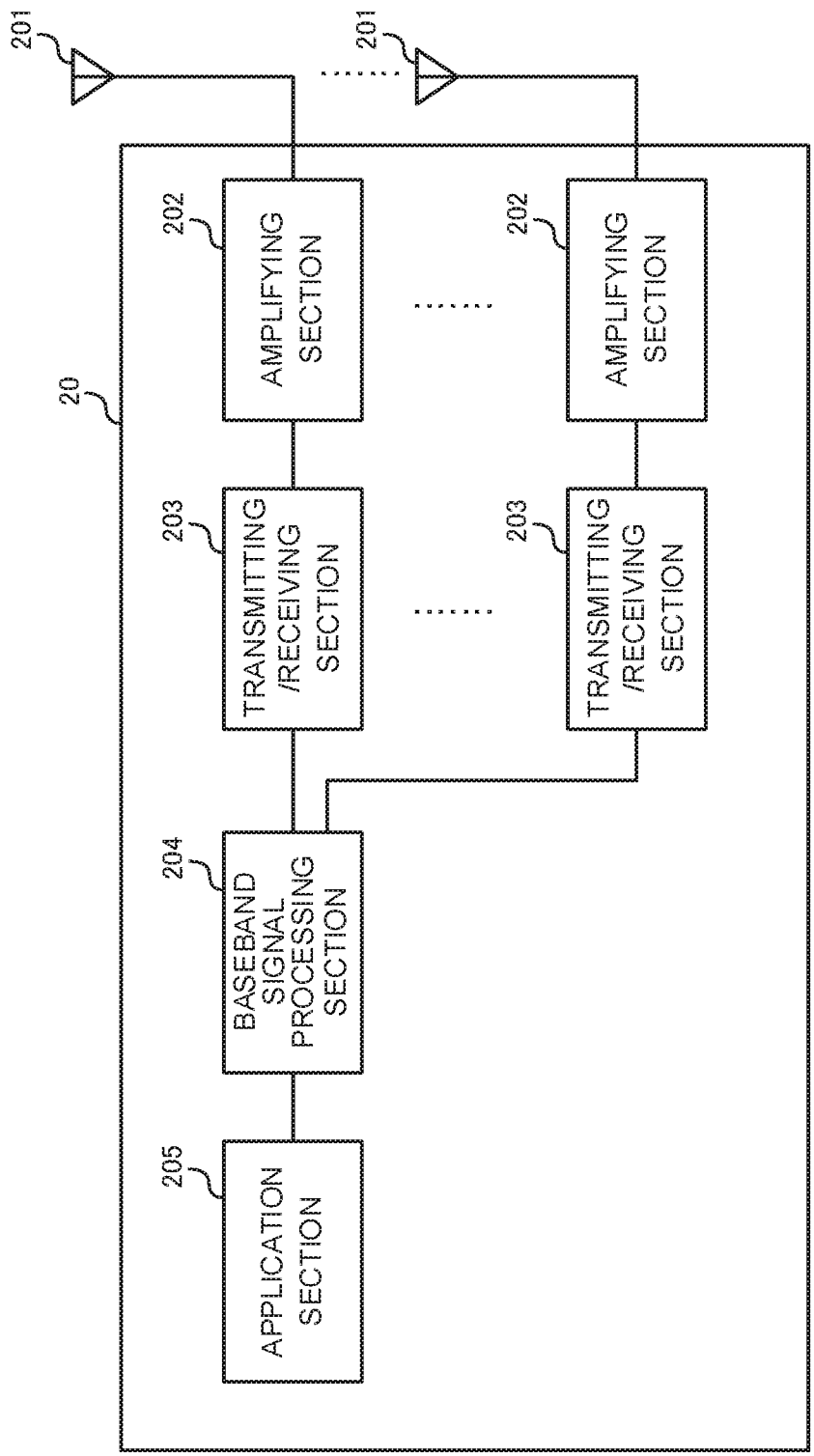
FIG. 13 is a diagram to show an example of an overall structure of a user terminal according to an embodiment of the present invention.

FIG. 13 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit a downlink control channel (for example, an NR-PDCCH) using a search space (a C-SS and/or a UE-SS). In addition, the transmitting/receiving sections 203 receive DL data and/or transmit UL data by applying cross-slot scheduling. Also, the transmitting/receiving sections 203 receive information about the allocation starting position of data in each slot via downlink control information that schedules this data and/or common control information that is common to predetermined user terminals.

Figure 14:
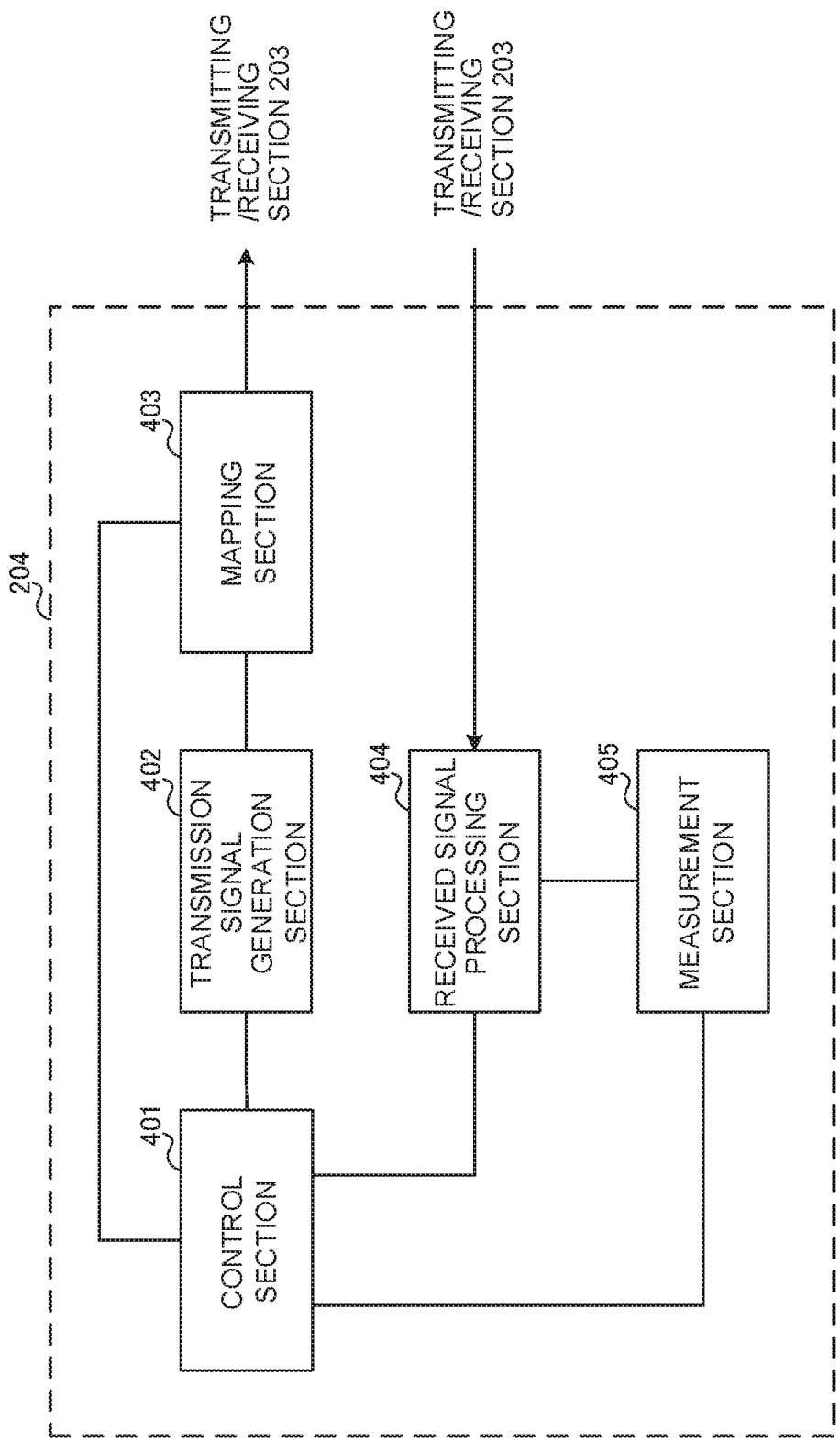
FIG. 14 is a diagram to show an example of a functional structure of a user terminal according to an embodiment of the present invention.

FIG. 14 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted in downlink control channels) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls receipt and/or transmission of data scheduled by downlink control information to which cross-slot scheduling is applied. For example, the control section 401 judges the position where the allocation of data in the time direction starts, based on downlink control information and/or common control information that is common to predetermined user terminals (see FIG. 3 to FIG. 9). The control section 401 may judge the data allocation starting position in a predetermined slot and the data allocation starting position in another slot based on downlink control information and/or the common control information provided in the predetermined slot.

The control section 401 may judge the data allocation starting position in a predetermined slot and the data allocation starting position in another slot based on downlink control information and/or the common control information provided in the predetermined slot. In addition, the control section 401 may control receipt and/or transmission of data in a predetermined slot and another slot based on downlink control information provided in the predetermined slot, and determine the data allocation starting positions in a predetermined slot and in another slot based on common control information provided in the predetermined slot. Also, the control section 401 controls receipt and/or transmission of data in a predetermined slot and another slot based on downlink control information provided in the predetermined slot, and the control section 401 may judge the data allocation starting position in each slot based on common control information that is transmitted in each slot.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
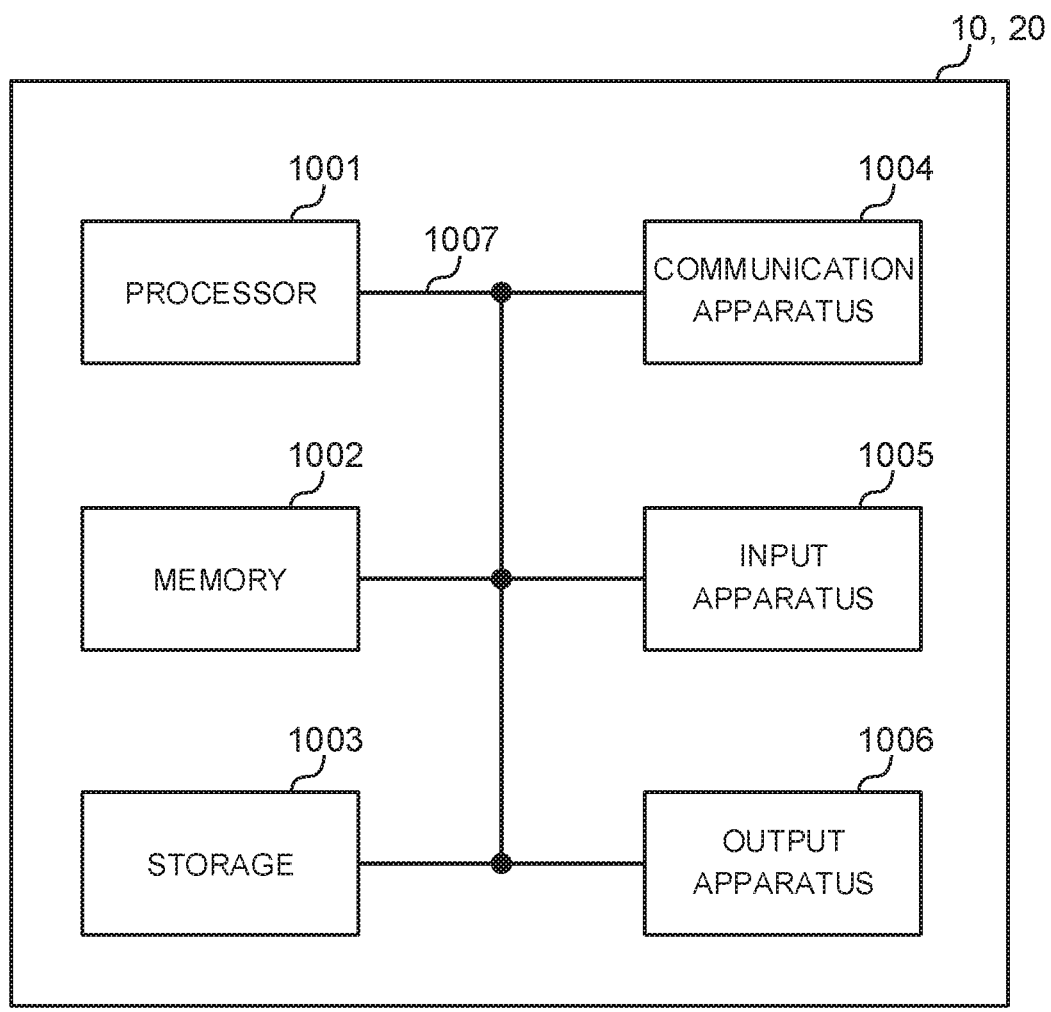
FIG. 15 is a diagram to show an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 15 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 And a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIB s) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station,"

"access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX(registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017972, filed on Feb. 2, 2017, including the specification, drawings and abstract, is incorporated herein by reference in its entirety.

The invention claimed is:

1. A terminal comprising:
   a receiver that receives downlink control information (DCI) for scheduling a physical shared channel; and
   a processor that controls at least one of reception or transmission of the physical shared channel, based on information included in the DCI about an allocation position of the physical shared channel in a time direction,
   wherein the processor controls the at least one of the reception or transmission of the physical shared channel both when the physical shared channel and the DCI are allocated to a same slot in the time direction and when the physical shared channel and the DCI are allocated to different slots in the time direction, wherein the information on the allocation position indicates a relation between a first slot in which the DCI is transmitted and a second slot to which the physical shared channel scheduled by the DCI is allocated, wherein the processor applies, to each of a plurality of consecutive slots, the information on the allocation position of the physical shared channel included in the DCI, and the information applied to each of the plurality of consecutive slots is the same as each other, and wherein the receiver receives, via higher layer signaling, information about a plurality of candidates each indicating a relation between a first slot in which the DCI is transmitted and a second slot to which the physical shared channel scheduled by the DCI is allocated, and the receiver receives information designating a specified candidate in the DCI.

2. The terminal according to claim 1, wherein the information on the allocation position indicates an allocation starting symbol for the physical shared channel.

3. The terminal according to claim 1, wherein the information on the allocation position indicates an allocation starting symbol for the physical shared channel and a symbol at which allocation of the physical shared channel ends.

4. The terminal according to claim 1, wherein the physical shared channel comprises at least one of a downlink shared channel or an uplink shared channel.

5. A radio communication method performed by a terminal, the method comprising:

receiving downlink control information (DCI) for scheduling a physical shared channel; and controlling at least one of reception or transmission of the physical shared channel, based on information included in the DCI about an allocation position of the physical shared channel in a time direction, wherein the at least one of the reception or transmission of the physical shared channel is controlled both when the physical shared channel and the DCI are allocated to a same slot in the time direction and when the physical shared channel and the DCI are allocated to different slots in the time direction, wherein the information on the allocation position indicates a relation between a first slot in which the DCI is transmitted and a second slot to which the physical shared channel scheduled by the DCI is allocated, wherein the information on the allocation position of the physical shared channel included in the DCI is applied to each of a plurality of consecutive slots, and the information applied to each of the plurality of consecutive slots is the same as each other, and wherein the terminal receives, via higher layer signaling, information about a plurality of candidates each indicating a relation between a first slot in which the DCI is transmitted and a second slot to which the physical shared channel scheduled by the DCI is allocated, and the terminal receives information designating a specified candidate in the DCI.

6. A radio communication system comprising:

a base station comprising a transmitter that transmits downlink control information (DCI) for scheduling a physical shared channel; and a terminal comprising:

a receiver that receives the DCI; and a processor that controls at least one of reception or transmission of the physical shared channel, based on information included in the DCI about an allocation position of the physical shared channel in a time direction, wherein the processor controls the at least one of the reception or transmission of the physical shared channel both when the physical shared channel and the DCI are allocated to a same slot in the time direction and when the physical shared channel and the DCI are allocated to different slots in the time direction, wherein the information on the allocation position indicates a relation between a first slot in which the DCI is transmitted and a second slot to which the physical shared channel scheduled by the DCI is allocated, wherein the processor applies, to each of a plurality of consecutive slots, the information on the allocation position of the physical shared channel included in the DCI, and the information applied to each of the plurality of consecutive slots is the same as each other, and wherein the receiver receives, via higher layer signaling, information about a plurality of candidates each indicating a relation between a first slot in which the DCI is transmitted and a second slot to which the physical shared channel scheduled by the DCI is allocated, and the receiver receives information designating a specified candidate in the DCI.

* * * * *